(12) United States Patent
Diggins et al.

(10) Patent No.: US 9,749,354 B1
(45) Date of Patent: Aug. 29, 2017

(54) ESTABLISHING AND TRANSFERRING CONNECTIONS

(71) Applicant: Amazon Technologies, Inc., Seattle, WA (US)

(72) Inventors: Michael F. Diggins, Seattle, WA (US); Bryan Mark Benson, Seattle, WA (US); Anton Romanov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 14/623,396

(22) Filed: Feb. 16, 2015

(51) Int. Cl.
*G06F 11/00* (2006.01)
*H04L 29/06* (2006.01)

(52) U.S. Cl.
CPC .................. *H04L 63/1458* (2013.01)

(58) Field of Classification Search
CPC .................................................. H04L 63/1458
USPC .......................................................... 726/23
See application file for complete search history.

(56) References Cited

U.S. PATENT DOCUMENTS

| | | | | |
|---|---|---|---|---|
| 7,921,282 B1* | 4/2011 | Mukerji | ............... | H04L 63/0428 713/151 |
| 8,200,957 B1* | 6/2012 | Mukerji | ............... | H04L 63/0428 713/151 |
| 9,027,129 B1* | 5/2015 | Kancherla | ........... | H04L 63/1458 726/22 |
| 9,438,702 B2* | 9/2016 | Kancherla | ............. | H04L 69/166 |
| 2002/0188753 A1* | 12/2002 | Tang | ....................... | H04L 29/06 709/237 |
| 2015/0215436 A1* | 7/2015 | Kancherla | ........... | H04L 63/1458 709/219 |

\* cited by examiner

*Primary Examiner* — Teshome Hailu
(74) *Attorney, Agent, or Firm* — Thorpe North & Western, LLP.

(57) ABSTRACT

Technology is described for establishing and transferring transmission control protocol (TCP) connections. A connection may be established when an acknowledgement (ACK) packet is received from the client. A connection handoff packet may be generated that includes connection parameters that describe the connection with the client. The connection handoff packet may be sent to a destination host to enable the destination host to take over the connection with the client based on the connection parameters in the SYN cookie.

16 Claims, 9 Drawing Sheets

ESTABLISHING AND TRANSFERRING CONNECTIONS

BACKGROUND

Denial-of-service (DoS) attacks or distributed denial-of-service (DDoS) attacks may be an attempt to cause a server computer (e.g., a server computer used in a computing service environment) to be unavailable to users. DoS attacks may involve concerted efforts to prevent the server computer from functioning (or to perform less efficiently) for a certain period of time. For example, the DoS attack may be performed by saturating the server computer with external communication requests, such that the server computer cannot respond to legitimate traffic or responds so slowly that the server computer is effectively rendered as unavailable. More specifically, a server may be saturated with SYN requests. SYN is short for a "synchronize" message and the SYN request is the first step in establishing communication between two systems over the TCP/IP (Transmission Control Protocol/Internet Protocol) protocol.

When a server receives a SYN request, the server responds with a SYN-ACK (synchronize and acknowledge) message. Under normal circumstances, the requesting computer may then respond with an ACK (acknowledge) message that establishes a connection between the two systems. In a SYN flood attack, an attacking computer may send a large number of SYN requests without sending back any ACK messages. Therefore, the server ends up waiting for multiple responses which tie up system resources. If the queue of response requests grows large enough, the server may not be able to respond to legitimate requests at all. This results in a slow or unresponsive server. DoS or DDoS attackers may target electronic sites or services hosted on web servers, such as cloud computing providers, e-commerce electronic pages, banks, credit card payment gateways, root name servers, etc.

DETAILED DESCRIPTION

Figure 1:
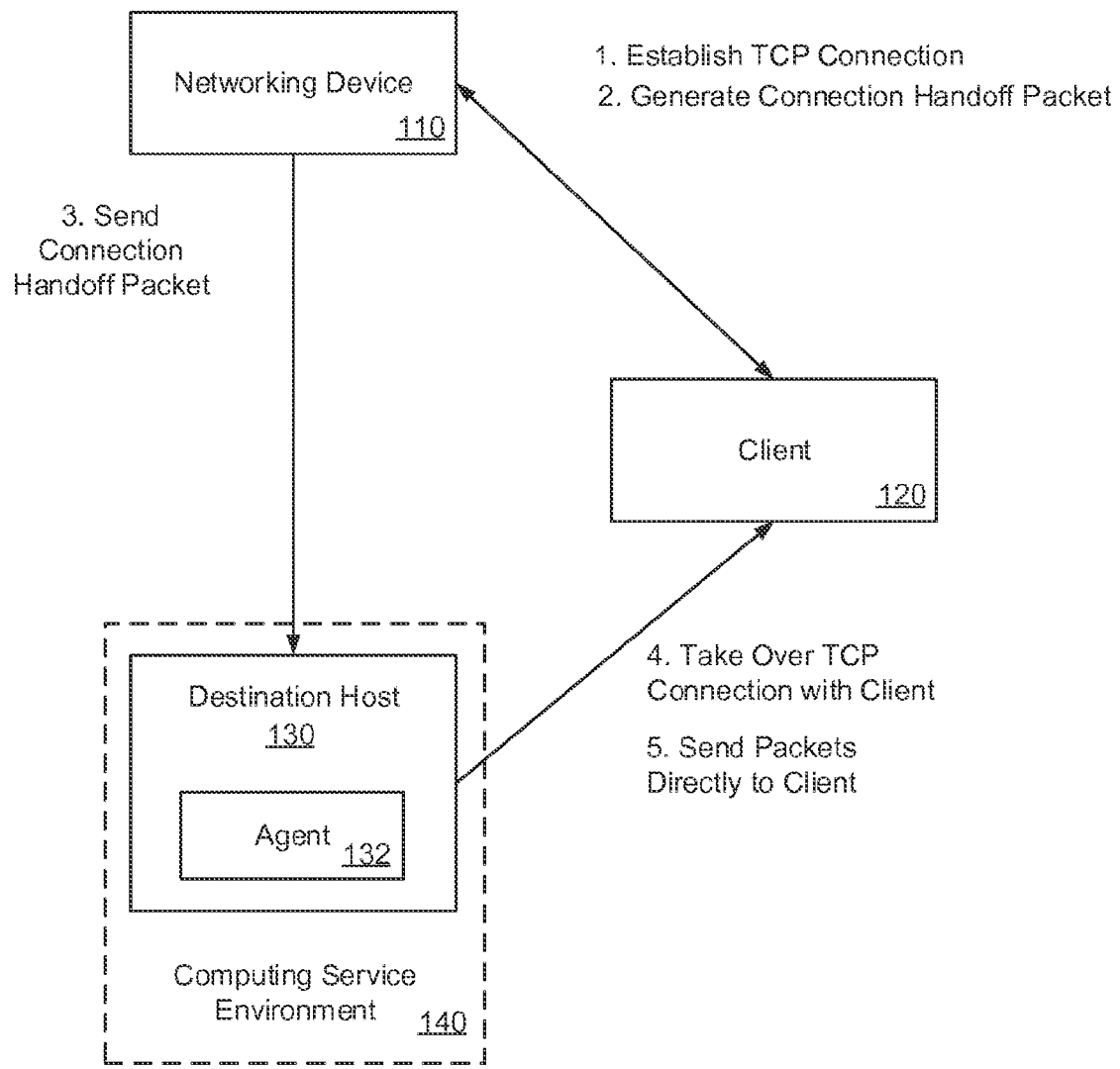
FIG. 1 illustrates a system and related operations for establishing and transferring transmission control protocol (TCP) connections according to an example of the present technology.

Technology is described for establishing a connection between a networking device and a client and then transferring the connection, such that a destination host takes over the connection with the client. The networking device may include a mitigation device, a denial-of-service mitigation device, a security device or a proxy device. The connection, such as a transmission control protocol (TCP) connection, may be established between the networking device and the client using an exchange of SYN, SYN-ACK (synchronization acknowledgement) with a SYN cookie, and ACK with SYN cookie messages between the networking device and the client. The networking device may generate a connection handoff packet containing connection parameters that characterize the connection between the networking device and the client. The networking device may send the connection handoff packet to the destination host. The destination host may take over the connection with the client using the connection parameters contained in the connection handoff packet, and thereby communicate packets directly to the client while bypassing the networking device.

In one configuration, the client may desire to establish a TCP connection with the destination host, and therefore, may send a SYN packet to the destination host. The networking device may be positioned to intercept and inspect the packets before the packets reach the destination host as a front line of defense in order to protect the destination host from malicious incoming packets from clients that may be trying to attack the destination host. The networking device may intercept the SYN packet communicated by the client. In one example, the networking device may detect that a number of SYN packets being received at the networking device exceeds a defined threshold. In other words, the networking device may detect that a potential denial of service (DoS) attack is occurring based on the number of SYN packets being received at the networking device. One example of a DoS attack is a SYN flood attack, which may occur when an excessive number of SYN request packets are received with an intention of overloading the destination host. Therefore, in order to mitigate the potential SYN flood attack, the networking device may respond to the client with a SYN-ACK message containing a SYN cookie.

As described in greater detail below, the SYN cookie may function to resist the SYN flood attack from the client(s). The client may receive the SYN-ACK message containing the SYN cookie from the networking device, and then respond with an ACK message that contains the SYN cookie. The ACK message may contain the SYN cookie in order to enable the networking device to verify that the SYN cookie contained in the ACK message is the same as the SYN cookie previously communicated to the client. The networking device may establish the TCP connection with the client using various connection parameters contained in the SYN cookie. Alternatively, the networking device may not establish the TCP connection with the client when the SYN cookie in the ACK message is illegitimate, when the ACK message does not include the SYN cookie and/or when the client does not respond to the SYN-ACK message containing the SYN cookie.

In one configuration, the networking device may generate a connection handoff packet containing the SYN cookie. In other words, the connection handoff packet may include the SYN cookie that was previously communicated from the networking device to the client and used to establish the connection between the networking device and the client. The SYN cookie may contain various connection parameters (e.g., TCP connection parameters) that characterize or describe the TCP connection between the networking device and the client. For example, the SYN cookie may include an initial sequence number. The connection handoff packet may include other connection parameters, such as a source internet protocol (IP) address, a source port, a destination IP address, a destination port, a maximum segment size, window scaling information, a selective ACK, etc.

The networking device may send the connection handoff packet to the destination host. The destination host may be part of a computing service environment. For example, the destination host may be included in a content delivery network (CDN) in the computing service environment. The destination host may receive the connection handoff packet and take over the TCP connection with the client using the initial sequence number (and other connection parameters) in the connection handoff packet. In other words, the TCP connection between the destination host and the client may use the connection parameters that were previously used to establish the TCP connection between the networking device and the client. As a result, the destination host may take over the TCP connection without the client ever knowing that a handoff took place. As a result, incoming packets from the client may be received at the destination host via the networking device, and outgoing packets from the destination host may be communicated directly to the client (over the rebuilt TCP connection) while bypassing the networking device.

FIG. 1 illustrates an exemplary system and related operations for establishing and transferring transmission control protocol (TCP) connections. A client 120 (e.g., a mobile device, a tablet computer, desktop computer, server, etc.) may initiate a TCP connection with a destination host 130 in a computing service environment 140. In a different example, the destination host 130 may be included in a content delivery network (CDN) in the computing service environment 140. The client 130 may communicate a SYN packet to the destination host 130 in order to establish the TCP connection. The SYN packet may be communicated to a router, and then the SYN packet may be intercepted at a networking device 110. So, the router may direct the SYN packet to the networking device 110. The networking device 110 may be a denial-of-service (DoS) mitigation device that protects the destination host 130 from malicious incoming packets from the client 120. For example, the networking device 110 may protect the destination host 130 from SYN flood attacks, i.e., an excessive number of SYN requests. The networking device 110 may communicate a SYN-ACK packet containing a SYN cookie back to the client 120. The client 120 may respond with an ACK with the SYN cookie to the networking device 110. The networking device 110 may verify that the SYN cookie in the ACK is authentic and then establish the TCP connection with the client 120.

The networking device 110 may generate a connection handoff packet that contains the SYN cookie previously generated at the networking device 110. The SYN cookie may include a portion of the connection parameters that were used to establish the TCP connection between the networking device 110 and the client 120, such as an initial sequence number. In addition, the connection handoff packet may include other types of connection information: a source internet protocol (IP) address, a source port, a destination IP address, a destination port, a maximum segment size, window scaling information, a selective ACK, etc. The networking device 110 may send the connection handoff packet to the destination host 130.

The destination host 130 may take over the TCP connection with the client 120 using the initial sequence number in the SYN cookie and the other connection parameters included in the connection handoff packet. In particular, an agent 132 that is running on the destination host 130 (e.g., a software agent or a software module) may enable the destination host 130 to take over the TCP connection with the client 120 using the connection handoff packet. In other words, the TCP connection between the destination host 130 and the client 120 may use substantially the same connection parameters that were previously used to generate the TCP connection between the networking device 110 and the client 120. Thereafter, the destination host 130 may directly send packets to the client 120, e.g., inbound packets may be received at the destination host 130 from the client 120 via the networking device 110, and outbound packets from the destination host 130 may be directly communicated to the client 120.

Figure 2:
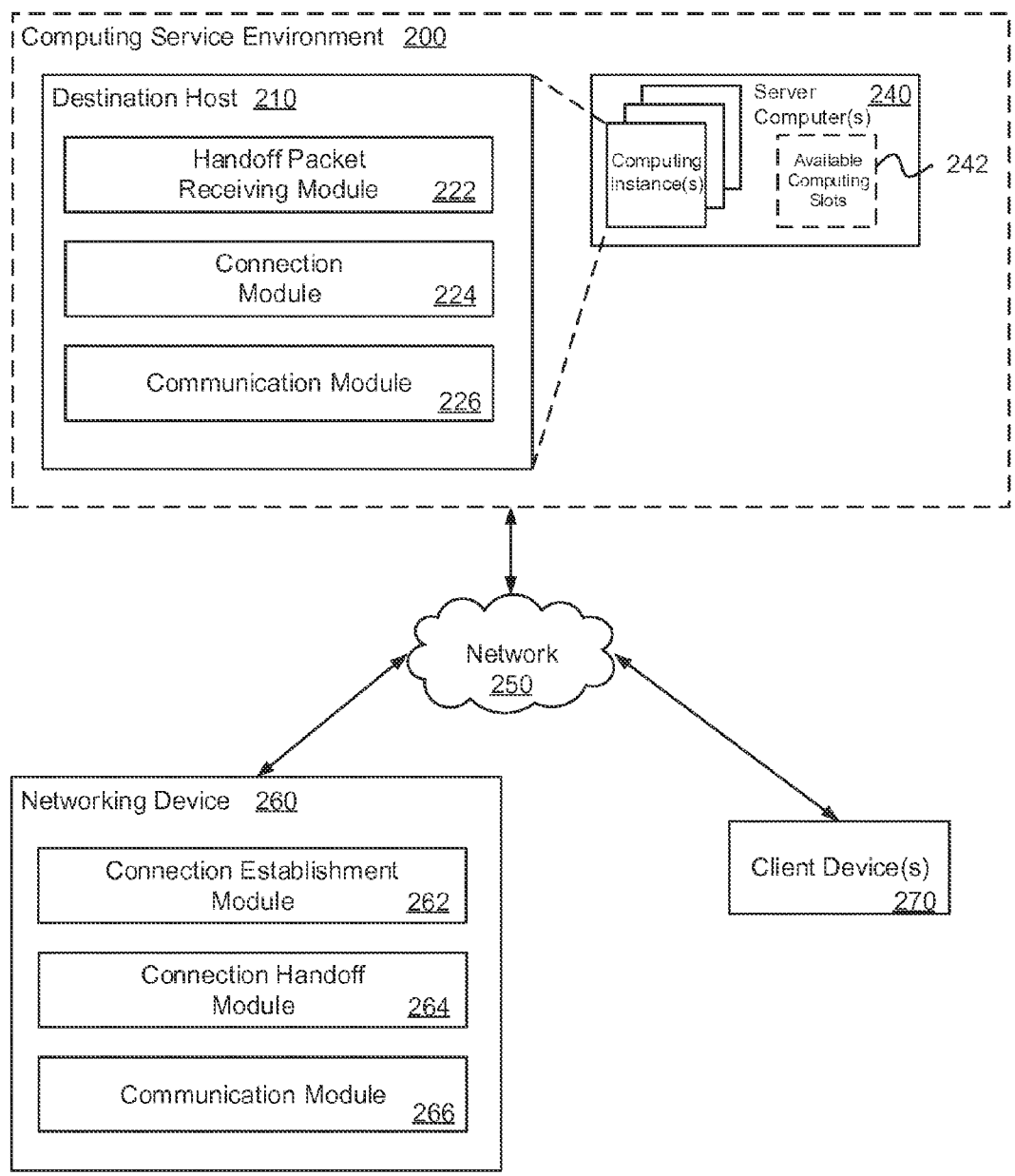
FIG. 2 is a block diagram that illustrates various components included in a system for establishing and transferring transmission control protocol (TCP) connections according to an example of the present technology.

FIG. 2 illustrates components of an example computing service environment 200 according to one example of the present technology. The computing service environment 200 may include a destination host 210 in communication with a networking device 260 and a client device 270 via a network 250. In one example, the networking device 260 may be a denial-of-service (DoS) mitigation device. The destination host 210 may contain a number of modules for establishing a transmission control protocol (TCP) connection with the client device 270 using connection parameters received from the networking device 260. In addition, the computing service environment 200 may include at least one server computer 240 (e.g., a physical host) executing a plurality of computing instances. In one example, the destination host 210 may be a computing instance that is executed on the server computer 240. The server computer 240 may communicate using a virtual network that is an overlay on an actual computing service network.

The server computer 240 may have available computing slots 242 (e.g., idle computing resources) that may be used to execute a computing instance. The available computing slots 242 may be allocated to customers who may then utilize an available computing slot 242 to execute the computing instance. Examples of computing instances may include on-demand computing instances, reserved computing instances and interruptible computing instances. An on-demand computing instance may be a computing instance that a customer may purchase and execute upon request. A reserved computing instance may be a reservation for a computing instance that a customer may purchase for a defined period of time making the computing instance available when the customer requests the computing instance, and an interruptible computing instance may be a computing instance that may be executed in a computing slot 242 not being used by another computing instance type unless the price being paid for the interruptible computing instance falls below a current bid price.

The destination host 210 may include a handoff packet receiving module 222, a connection module 224, a communication module 226, and other applications, services, processes, systems, engines, or functionality not discussed in detail herein. The handoff packet receiving module 222 may be configured to receive a connection handoff packet from the networking device 260. The connection handoff packet may include a SYN cookie that was previously communicated from the networking device 260 to the client device 270 and was used to establish a connection (e.g., a TCP connection) between the networking device 260 and the client device 270. The SYN cookie may contain various connection parameters (e.g., TCP connection parameters) that characterize or describe the TCP connection between the networking device 260 and the client 270. For example, the connection parameters may include an initial sequence number. In addition, the connection handoff packet may include other connection parameters, such as a source internet protocol (IP) address, a source port, a destination IP address, a destination port, a maximum segment size, window scaling information, a selective ACK, etc.

The connection module 224 may be configured to take over a connection (e.g., a TCP connection) with the client device 270 using the SYN cookie contained in the connection handoff packet. In other words, the connection module 224 may transfer the connection to the destination host 210 (originally created on the networking device 260 to) in order for the destination host 210 to directly communicate with the client device 270 over the connection. The connection may use the same connection parameters as were previously used to generate the connection between the networking device 260 and the client device 270. For example, the connection may use the same initial sequence number encoded in the SYN cookie, as well as the other connection parameters. The initial sequence number may be a unique 32-bit sequence number assigned to the connection and used during communications between the destination host 210 and the client device 270. Both the destination host 210 and the client device 270 may each provide an initial sequence number when setting up the connection. In this example, the connection module 224 may take over the TCP connection using the SYN cookie that was not generated at the destination host 210, but rather at the networking device 260.

The communication module 226 may send packets directly to the client device 270 using the connection established with the client device 270. In other words, the communication module 226 may communicate the packets over the TCP connection that was taken over from the networking device 260. In addition, the packets from the communication module 226 may bypass the networking device 260 when being sent to the client device 270. Therefore, incoming packets from the client device 270 may be received at the destination host 210 via the networking device 260, but outgoing packets from the destination host 210 may be communicated directly to the client device 270. The networking device 260 may handle the incoming packets, but not the outgoing packets, in order to maximize DoS mitigation capability at the networking device 260.

The networking device 260 may include a connection establishment module 262, a connection handoff module 264, a communication module 266, and other applications, services, processes, systems, engines, or functionality not discussed in detail herein. The connection establishment module 262 may be configured to establish a connection with the client device 270. In one configuration, the connection established between the networking device 260 and the client device 270 may be a transmission control protocol (TCP) connection. The connection establishment module 262 may receive the SYN packet from the client device 270. The connection establishment module 262 may detect a potential denial-of-service (DoS) attack from the client device 270 or that a number of SYN packets received at the networking device 260 exceeds a defined threshold. Therefore, the connection establishment module 262 may send a SYN-ACK packet having a SYN cookie to the client device 270. The connection establishment module 262 may receive the ACK packet that includes the SYN cookie from the client device 270. The networking device 260 may establish the connection with the client device 270 upon validation of the SYN cookie in the ACK packet.

The connection handoff module 264 may be configured to generate a connection handoff packet containing the SYN cookie, i.e., the SYN cookie previously communicated from the connection establishment module 262 to the client device 270. The SYN cookie may include a portion of the connection parameters (e.g., TCP connection parameters) that describe the connection between the networking device 260 and the client device 270, such as an initial sequence number. In addition, the connection handoff packet may include other connection parameters, such as a source port, a destination port, a maximum segment size, etc. that describes the TCP connection between the networking device 260 and the client device 270.

The communication module 266 may be configured to send the connection handoff packet to the destination host 210. The destination host 210 may then take over a connection with the client device 270 using the SYN cookie (e.g., the connection parameters) in the connection handoff packet received from the communication module 266. In other words, the networking device 260 may transfer the connection (e.g., the TCP connection) with the client device 270 to the destination host 210. The connection between the destination host 210 and the client device 270 may use the connection parameters that were previously used in the connection between the networking device 260 and the client device 270.

The client device 270 may be utilized by a customer to request setup of a TCP connection with the destination host 210. The client device 270 may communicate a SYN packet in order to request the setup of the TCP connection. In response to receiving a SYN-ACK packet, the client device 270 may communicate an ACK packet in order to complete the setup and establish the TCP connection. In one configuration, the TCP connection may be initially set up between the client device 270 and the networking device 260, and then transferred to the destination host 210. The client device 270 may communicate with the destination host 210 directly upon completion of the TCP connection. The client device 270 may include any device capable of sending and receiving data (e.g., packets) over the network 250. The client device 270 may comprise, for example a processor-based system such as a computing device. The client device 270 may be a device such as, but not limited to, a desktop computer, laptop or notebook computer, tablet computer, mainframe computer system, handheld computer, workstation, network computer, or other devices with like capability.

The various processes and/or other functionality contained within the computing service environment 200 may be executed on one or more processors that are in communication with one or more memory modules. The computing service environment 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
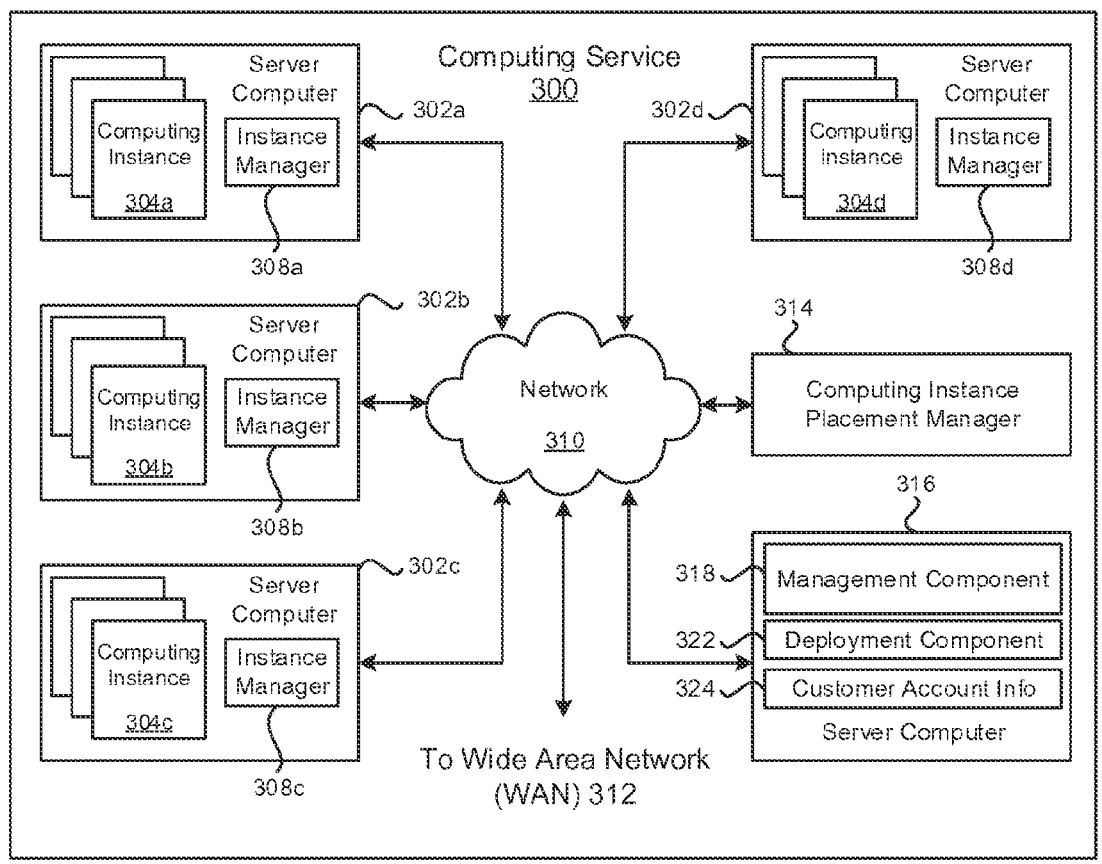
FIG. 3 is a block diagram of a computing service environment according to an example of the present technology.

FIG. 3 is a block diagram illustrating an example computing service 300 that may be used to execute and manage a number of computing instances 304a-d. The computing instances 304a-d may include the destination host described above. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a computing instance placement manager that may perform functions, such as querying the server computers 302a-d for available computing slots and computing group state information, as well as determining a placement of a computing instance 304a-d in an available computing slot. In addition, the server computer 314 may include functionality of the destination host 210.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, as many more networks and networking devices may be utilized to interconnect the various computing systems disclosed herein.

Figure 4:
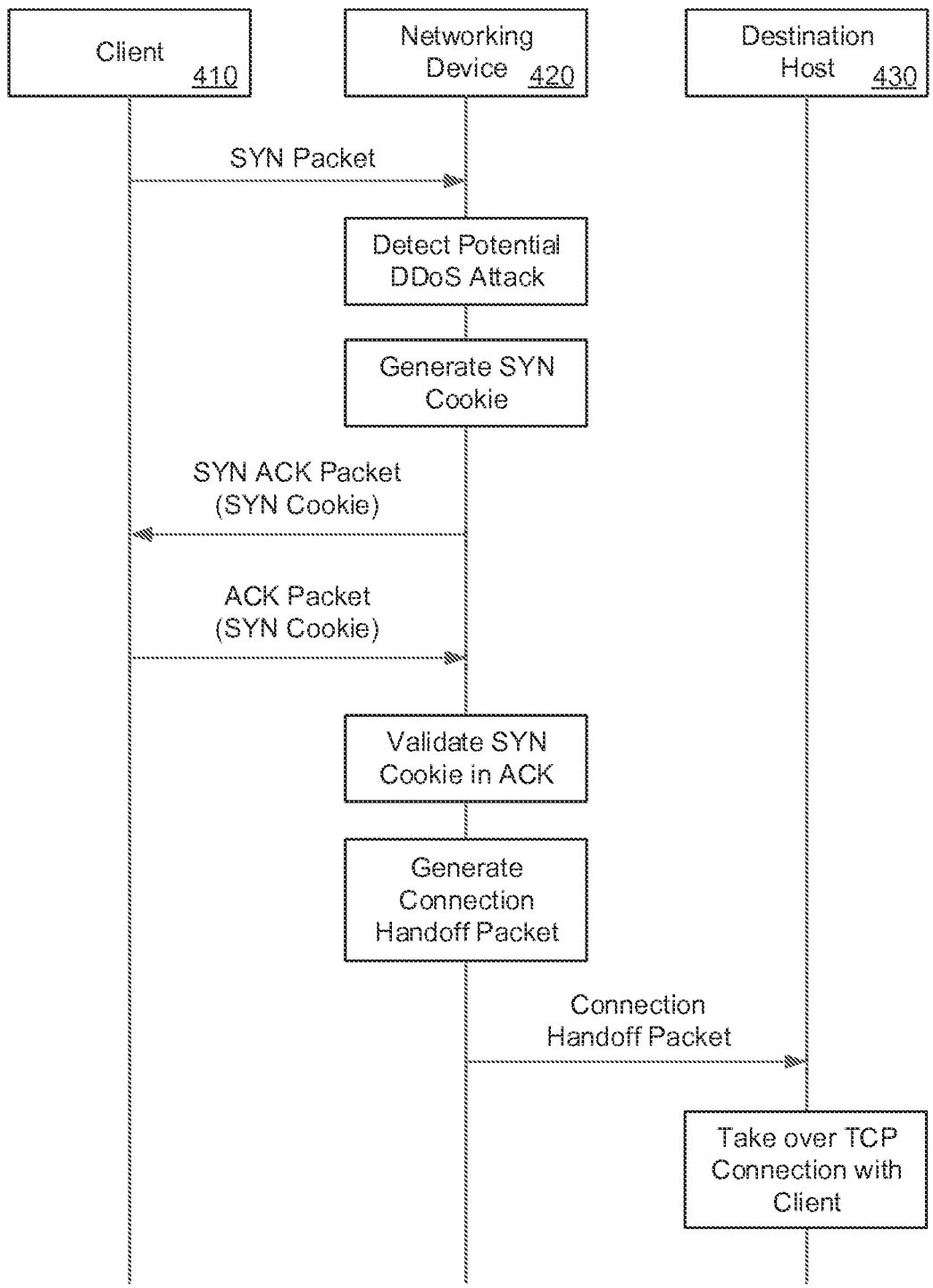
FIG. 4 illustrates operations for establishing a transmission control protocol (TCP) connection between a client and a networking device and transferring the TCP connection with the client to a destination host according to an example of the present technology.

FIG. 4 illustrates exemplary operations for establishing a transmission control protocol (TCP) connection between a client 410 and a networking device 420 and then transferring the TCP connection, such that the TCP connection is established between the client 410 and a destination host 430. In other words, the networking device 420 may initially create the TCP connection and then hand off the TCP connection to the destination host 430. In one example, the destination host 430 may be included in a content delivery network (CDN) in a computing service environment. The destination host 430 in the CDN may be capable of delivering streaming media content (e.g., audio or video content), web content, static or dynamic content, etc.

The networking device 420 may be a denial-of-service (DoS) mitigation device. The networking device 420 may be positioned to capture communications before the packets reach the destination host 430, as a line of defense in order to protect the destination host 430 from incoming packets that are malicious, e.g., from the client 410. The networking device 420 may intercept the incoming packets, remove any malicious packets from the incoming packet streams, and then send the remaining packets (i.e., the non-malicious packets) to the destination host 430. In addition, the networking device 420 may implement a number of mitigation techniques to protect the destination host 430 from malicious incoming packets. For example, the networking device 420 may implement a SYN proxy in order to protect the destination host 430 against SYN flood attacks from the client 410. The networking device 420 may allow legitimate clients to establish TCP connections with the destination host 430, even when a SYN flood attack is occurring at the destination host 430.

In general, a SYN flood attack is a form of DoS attack that occurs when an attacker (e.g., a malicious client) sends a succession of SYN requests to a destination host in an attempt to consume enough resources to cause the destination host to become unresponsive to legitimate traffic (e.g., SYN requests from legitimate clients). When the client desires to establish a TCP connection with the destination host, a series of messages may be exchanged between the client and the destination host to establish the TCP connection. For example, the client may request the TCP connection by sending a SYN message to the destination host. The destination host may acknowledge this request by sending a SYN-ACK message back to the client. The client may respond with an ACK message and the TCP connection is established between the client and the destination host. During a SYN flood attack, the attacker may send a succession of SYN packets to the destination host, and the destination host may respond with the SYN-ACK packets. However, the client may intentionally not respond with ACK messages, which results in a plurality of half-open TCP connections at the destination host. These half-open connections may bind resources on the destination host until additional TCP connections cannot be established with clients, thereby resulting in a denial of service to legitimate traffic.

Existing techniques for resisting SYN flood attacks may involve using SYN cookies. The use of SYN cookies may allow the destination host to avoid dropping TCP connections (or being prevented from establishing additional TCP connections) as may occur when a SYN queue fills up at the destination host. In response to receiving the SYN packet, the destination host may send an appropriate SYN-ACK message to the client, but discards a SYN queue entry at the destination host. The SYN-ACK message may include the SYN cookie. The SYN cookie may include an initial sequence number, as well as other connection parameters. Thus, the destination host may generate the SYN cookie and communicate the SYN cookie along with the SYN-ACK message to the client. If the destination host receives the ACK message (with the SYN cookie) from the client, the destination host may construct the TCP connection using the connection parameters encoded in the SYN cookie (e.g., the initial sequence number). Therefore, the destination host does not waste resources when waiting for the ACK message from the client. If the client does not respond with the ACK message, then no TCP connection is created. If the client does respond with the ACK message, the ACK message may contain the necessary information (e.g., the initial sequence number) for the destination host to establish the TCP connection with the client. Since the SYN queue entry may be discarded, the attacker loses their leverage because the destination host is not wasting resources waiting for the attacker to respond with the ACK message.

In some situations, the traditional SYN cookie defense against SYN flood attacks may be inadequate. For example, the destination host may be incapable of generating SYN cookies fast enough to keep up with the number of SYN messages being received at the destination host. In other words, a vast SYN flood attack may exceed the destination host's capabilities because the destination host may receive the SYN messages faster than the destination host's ability to generate the SYN cookies and respond to the SYN messages. As another example, various connection parameters (e.g., windows scaling information, selective ACKs) that are initially encoded in the SYN cookie may be lost when the destination host establishes the TCP connection with the client. As a result, a throughput of the TCP connection may be reduced because these connection parameters were lost.

Referring to FIG. 4, the client 410 may send a SYN packet for setting up a TCP connection with the destination host 430. Since the networking device 420 may protect the destination host 430 from malicious incoming packets, the networking device 420 may intercept the SYN packet that is communicated from the client 410. The client 410 may be a malicious attacker or a legitimate client. The networking device 420 may determine whether a number of SYN packets being received at the networking device 420 exceeds a defined threshold, and if so, the networking device 420 may go into a defense mode (i.e., a DoS mitigation mode). Alternatively, the networking device 420 may be configured to always be in the defense mode, regardless of the number of SYN packets being received at the networking device 420.

The networking device 420 may generate a SYN cookie, e.g., information that the networking device 420 can later use to establish a TCP connection with the client 410 if the client 410 responds with a legitimate ACK message. The SYN cookie may include an initial sequence number. The initial sequence number may be a unique 32-bit sequence number assigned to the TCP connection and used during communications between the networking device 420 and the client 410. The networking device 420 may respond to the client 410 with a SYN-ACK message that contains the SYN cookie. Since the networking device 420 may generate the SYN cookie for the client 410 (which contains the necessary information for establishing the TCP connection), resources are not consumed on the client 410.

The networking device 420 may include the SYN cookie in the SYN-ACK packet that is communicated to the client 410. If the client 410 is an attacker, the client 410 may not respond with the ACK message to the networking device 420. However, the networking device 420 may not waste resources waiting for the attacker to respond. If the client 410 is a legitimate client, the client 410 may respond with the ACK message (which includes the SYN cookie) to the networking device 420. The networking device 420 may verify that the SYN cookie received along with the ACK message is the same SYN cookie that was previously communicated to the client 410 (in the SYN-ACK message). The networking device 420 may verify an authenticity of the SYN cookie using various cryptographic techniques. The TCP connection may be established between the client 410 and the networking device 420 upon the SYN cookie being validated. In other words, the networking device 420 may use the connection parameters encoded in the SYN cookie (e.g., the initial sequence number) to establish the TCP connection with the client 410.

In past solutions, the server that communicates content (e.g., media content) over the TCP connection to the client may generate the SYN cookie. However, in the technology described herein, the networking device 420 that generates the SYN cookie may merely be an intermediary device between the client 410 and the destination host 430. In other words, a TCP connection may be formed between the client 410 and the destination host 430 in order for the client 410 to receive content (e.g., web pages, media content) from the destination host 430. Therefore, the technology described herein may enable the destination host 430 to take over the TCP connection with the client 410, even though the destination host 430 did not generate the SYN cookie (e.g., choose the initial sequence number) used for establishing the initial TCP connection between the networking device 420 and the client 410.

The networking device 420 may generate a connection handoff packet. The connection handoff packet may contain the SYN cookie. Accordingly, the connection handoff packet may include the SYN cookie that was previously communicated from the networking device 420 to the client 410 which was used to establish the connection between the networking device 420 and the client 410. As described earlier, the SYN cookie may contain the various connection parameters (e.g., TCP connection parameters) that characterize or describe the TCP connection between the networking device 420 and the client 410. The networking device 420 may send the connection handoff packet containing the SYN cookie to the destination host 430.

The destination host 430 may receive the connection handoff packet containing the SYN cookie from the networking device 420. The destination host 430 may decode the SYN cookie in order to identify the connection parameters (e.g., the initial sequence number, etc.). The destination host 430 may take over the TCP connection with the client 410 using the connection parameters encoded in the SYN cookie. The destination host 430 may take over the TCP connection with the client 410 as if the destination host 430 had originally generated the SYN cookie and set up the TCP connection with the client 410 using the SYN cookie. In one example, a software agent running on the destination host 430 may receive the connection handoff packet and establish the TCP connection using the connection parameters included in the connection handoff packet. In other words, the destination host 430, via the software agent, may take over the TCP connection that is substantially similar or even identical to the TCP connection that the networking device 420 previously set up with the client 410. Furthermore, the TCP connection between the destination host 430 and the client 410 may use substantially the same connection parameters (e.g., the same initial sequence number) as used by the networking device 420 when setting up the TCP connection with the client 410.

Since the networking device 420 hands off the TCP connection to the destination host 430, the networking device may not handle return traffic (i.e., packets from the destination host 430 to the client 410). Rather, outgoing packets from the destination host 430 may be communicated directly to the client 410 while bypassing the networking device 420, whereas incoming packets from the client 410 may be received at the destination host 430 via the networking device 420. Therefore, the networking device 420 may be responsible for handing inbound traffic, but not outbound traffic. The concept of delivering the outbound traffic in a different direction as compared to the inbound traffic may be referred to as direct server return. Direct server return is the concept of having traffic take a defined path through a network to a server in an inbound direction, and then the traffic may flow back to a client according to an outbound direction that is different than the inbound direction. As a result, the networking device 420 may process a greater number of inbound packets because the networking device 420 does not process outgoing packets.

In one configuration, the inbound traffic (e.g., SYN requests) may be spread across a plurality of networking devices. The inbound traffic may be received at a point of presence (POP) and then spread among the plurality of networking devices. Each networking device 420 may mitigate attacks stemming from the inbound packets before those packets reach other network devices, such as the destination host 430. In addition, the networking device's architecture may scale up to a size of the attack. For example, if the POP supports 80 gigabytes (GB) of bandwidth, then the plurality of networking devices may be capable of handling an 80 GB inbound SYN flood attack.

Figure 5:
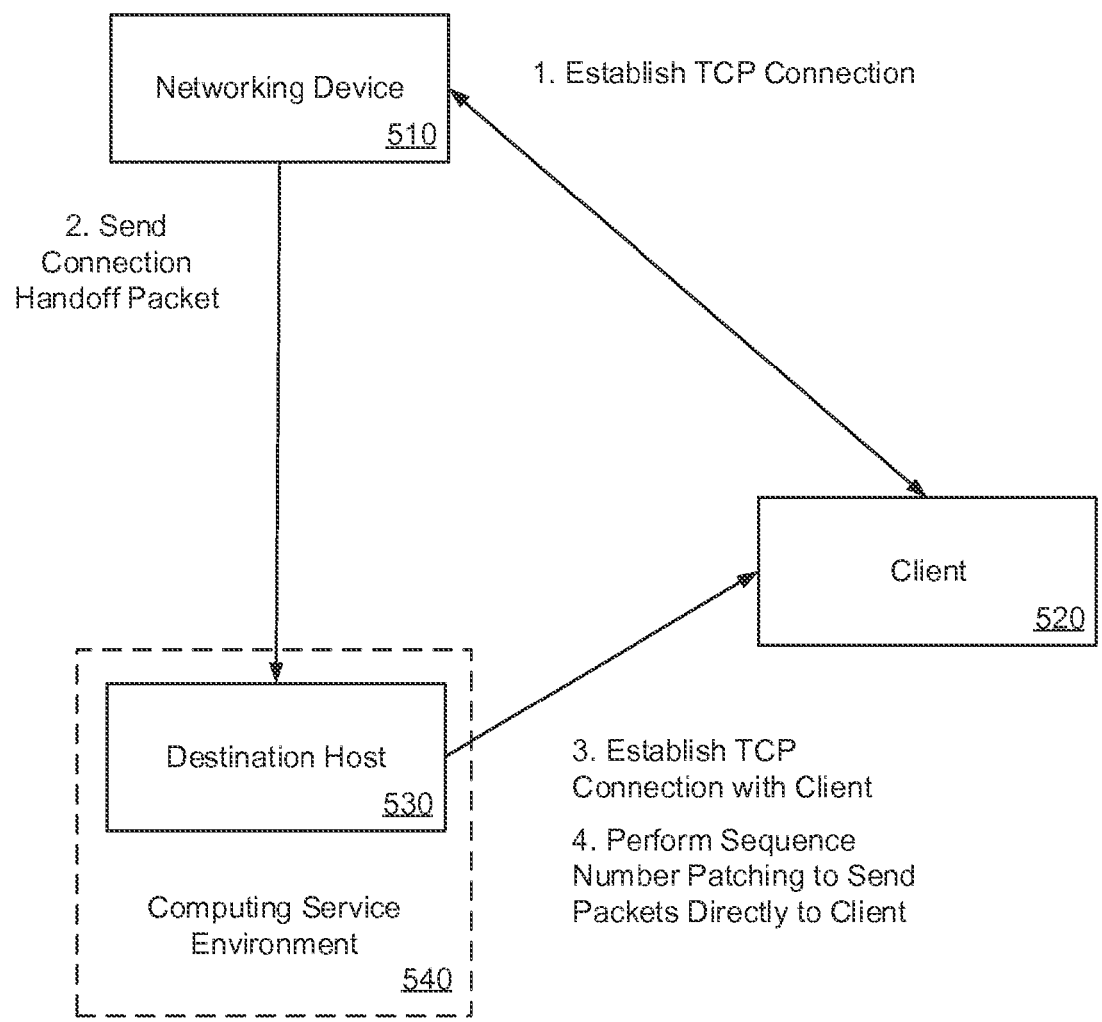
FIG. 5 illustrates a system and related operations for establishing transmission control protocol (TCP) connections using an initial sequence number patching technique according to an example of the present technology.

FIG. 5 illustrates an exemplary system and related operations for establishing transmission control protocol (TCP) connections using a sequence number patching technique. A TCP connection may be established between a networking device 510 (e.g., a denial-of-service mitigation device) and a client 520. The TCP connection may be established using an exchange of SYN, SYN-ACK (synchronize and acknowledgement) with a SYN cookie, and ACK with SYN cookie messages between the networking device 510 and the client 520. The networking device 510 may generate the SYN cookie (e.g., including an initial sequence number) and generate the TCP connection using the initial sequence number (and other connection parameters) encoded in the SYN cookie.

The networking device 510 may communicate a series of packets to a destination host 530. The destination host 530 may be included in a computing service environment 540. The networking device 510 may communicate the series of packets to enable the destination host 530 to set up a separate TCP connection with the client 520. For example, the networking device 510 may communicate the SYN, SYN-ACK and ACK messages to the destination host 530. The destination host 530 may generate a separate initial sequence number, as compared to the initial sequence number generated by the networking device 510, and use the separate initial sequence number to build the separate TCP connection with the client 520.

In one configuration for sequence number patching, the destination host 530 may determine an offset between the initial sequence number generated at the networking device 510 and the separate initial sequence number generated at the destination host 530. The offset (e.g., an initial sequence number offset) may be a fixed offset. The destination host 530 may correct the initial sequence number for each packet coming from the networking device 510 using the fixed offset. In addition, the destination host 530 may correct the separate sequence number for each packet flowing out of the destination host 530 to the client 520 using the fixed offset. Since the destination host 530 generates the TCP connection with the client 520 using an initial sequence number that is different than the initial sequence number generated at the networking device 510, the destination host 530 may implement the sequence number patching technique in order to account for the offset between the initial sequence numbers. One downside in this technique is that the packets are processed twice at the destination host 530. In other words, the destination host 530 may process incoming packets as well as outgoing packets, e.g., perform sequence number patching in both the inbound and outbound direction.

In an alternative configuration for sequence number patching, the networking device 510 may determine the offset between the initial sequence number generated at the networking device 510 and the separate initial sequence number generated at the destination host 530. The networking device 510 may intercept each packet coming from the client 520 that is addressed to the destination host 530. The networking device 510 may correct the initial sequence number associated with the packet according to the fixed offset. Similarly, the networking device 510 may intercept each packet coming from the destination host 530 that is addressed to the client 520. The networking device 510 may correct the separate initial sequence number associated with the packet according to the fixed offset. However, one downside in this technique is that the packets are processed twice at the networking device 510 (e.g., in both the inbound and outbound direction).

In the sequence number patching examples described above, the sequence number offsets may be stored at the destination host 530 or the networking device 510 for a duration of the TCP connections. Therefore, if the sequence number offsets are lost, subsequent packets may be unable to be processed for those TCP connections. If the networking device 510 stores sequence number offset information for a plurality of TCP connections, then the plurality of TCP connections may be rendered useless because subsequent packets may not be processed by the networking device 510.

Figure 6:
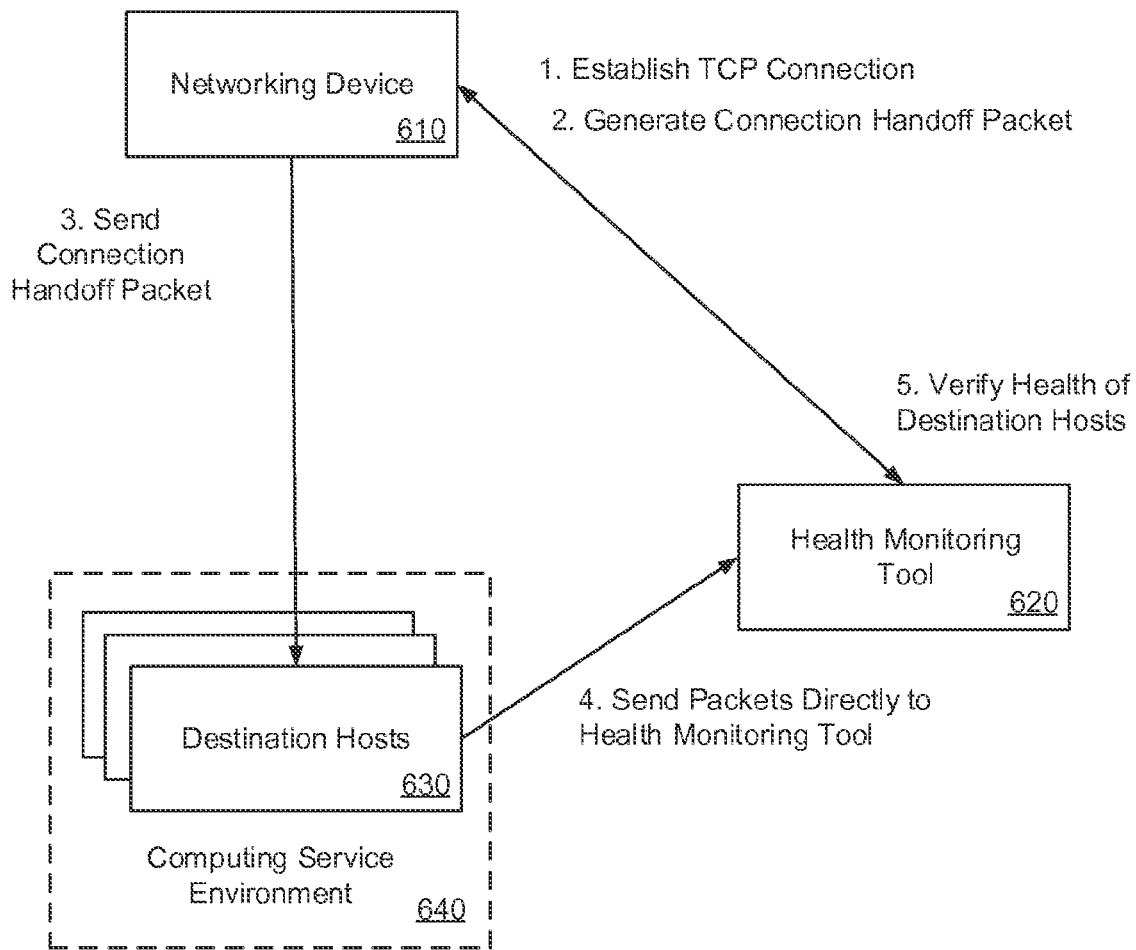
FIG. 6 illustrates a system and related operations for monitoring a transmission control protocol (TCP) connection using a health monitoring tool according to an example of the present technology.

FIG. 6 illustrates an exemplary system and related operations for verifying performance of a plurality of destination hosts 630 using a health monitoring tool 620. The destination hosts 630 may be included in a computing service environment 640. For example, the destination hosts 630 may be responsible for providing content (e.g., web pages, media content) to a plurality of clients. The health monitoring tool 620 may be located on the network-side and function to ensure reliability among the destination hosts 630. In other words, the health monitoring tool 620 may verify that each destination host 630 is able to establish and maintain transmission control protocol (TCP) connections with the clients using SYN cookies (e.g., connection parameters) in a connection handoff packet, as described above.

The health monitoring tool 620 may assume a role of the client and attempt to establish a TCP connection with each of the destination hosts 630 in the computing service environment 640. The health monitoring tool 620 may attempt to establish the TCP connection with each of the destination hosts 630 via a networking device 610 (e.g., a denial-of-service mitigation device). The health monitoring tool 620 may use a fixed internet protocol (IP) address, i.e., an IP address that is assigned only to the health monitoring tool 620. The networking device 610 may receive a SYN packet from the health monitoring tool 620 and automatically respond with a SYN-ACK message (with a SYN cookie) back to the health monitoring tool 620. The networking device 610 may be configured to automatically respond with SYN cookies when receiving SYN packets from the fixed IP address of the health monitoring tool 620, regardless of whether the networking device 610 is under a SYN flood attack.

The health monitoring tool 620 may receive the SYN-ACK message containing the SYN cookie from the networking device 610. The health monitoring tool 620 may communicate an ACK message with the SYN cookie back to the networking device 610. The networking device 610 may validate the SYN cookie and establish the TCP connection with the health monitoring tool 620. The networking device 610 may generate a connection handoff packet containing the SYN cookie, i.e., connection parameters that describe the TCP connection with the health monitoring tool 620. The networking device 610 may send the connection handoff packet to the destination host 630. The destination host 630 may take over the TCP connection with the health monitoring tool 620 using the connection parameters that are included in the SYN cookie. The health monitoring tool 620 and the destination host 630 may communicate packets back and forth. If the described process fails to occur or fails a certain number of times in a row, that particular destination host 630 may potentially be in error and a human operator may be alerted. The health monitoring tool 620 may check the health of each destination host 630 in the computing service environment 640, and if a particular destination host 630 is acting abnormally, may alert the human operator.

Figure 7:
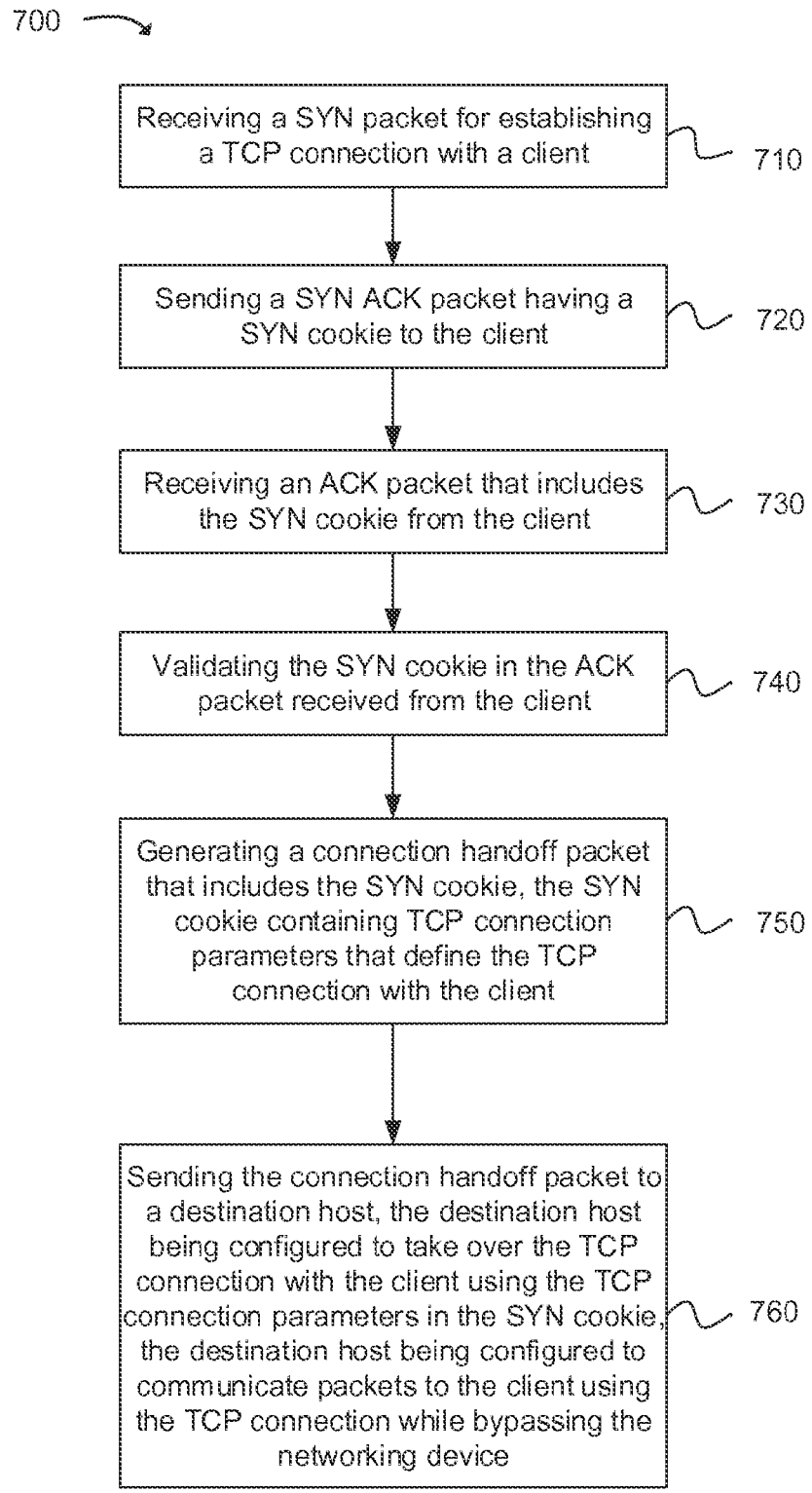
FIG. 7 is a flowchart of an example method for establishing and transferring transmission control protocol (TCP) connections.

FIG. 7 is a flowchart of an example method for establishing and transferring transmission control protocol (TCP) connections. A SYN packet for establishing a TCP connection with a client may be received, as in block 710. For example, a networking device, such as a denial-of-service (DoS) mitigation device, may receive the SYN packet from the client.

A SYN-ACK packet having a SYN cookie may be communicated to the client, as in block 720. For example, the networking device may communicate the SYN-ACK packet to the client in response to receiving the SYN packet from the client. In one configuration, the networking device may generate the SYN cookie during a potential denial-of-service (DoS) attack, and send the SYN-ACK packet containing the SYN cookie to the client in order to mitigate the potential DoS attack. In another example, the networking device may generate the SYN cookie when a number of SYN packets received at the networking device exceeds a defined threshold, and send the SYN-ACK packet containing the SYN cookie to the client.

An ACK packet that includes the SYN cookie may be received from the client, as in block 730. The client may communicate the ACK packet (with the SYN cookie) to the networking device in order to complete setup of the TCP connection between the client and the destination host. In other words, the ACK packet may be a final packet communicated in a three-way handshake between the client and the networking device to establish the TCP connection.

The SYN cookie included in the ACK packet may be validated, as in block 740. For example, the networking device may verify that the SYN cookie in the ACK packet is the same SYN cookie as was communicated to the client in the SYN-ACK packet. The networking device may authenticate the SYN cookie when the ACK packet received from the client is legitimate, i.e., substantially similar to the previous SYN cookie included in the SYN-ACK packet.

A connection handoff packet that includes the SYN cookie may be generated, as in block 750. The SYN cookie may contain TCP connection parameters that characterize the TCP connection with the client (i.e., the TCP connection between the networking device and the client). The TCP connection parameters in the SYN cookie may include an initial sequence number. In addition, the connection handoff packet may include a source internet protocol (IP) address, a source port, a destination IP address, a destination port, a maximum segment size, window scaling information, or a selective acknowledgement (ACK).

The connection handoff packet may be communicated to a destination host, as in block 760. The destination host may be configured to take over the TCP connection with the client using the TCP connection parameters in the SYN cookie. The destination host may communicate packets directly to the client using the TCP connection while bypassing the networking device. In one example, the networking device may generate an initial sequence number that is encoded in the SYN cookie, and the same initial sequence number may be used for the TCP connection that is taken over between the destination host and the client.

Figure 8:
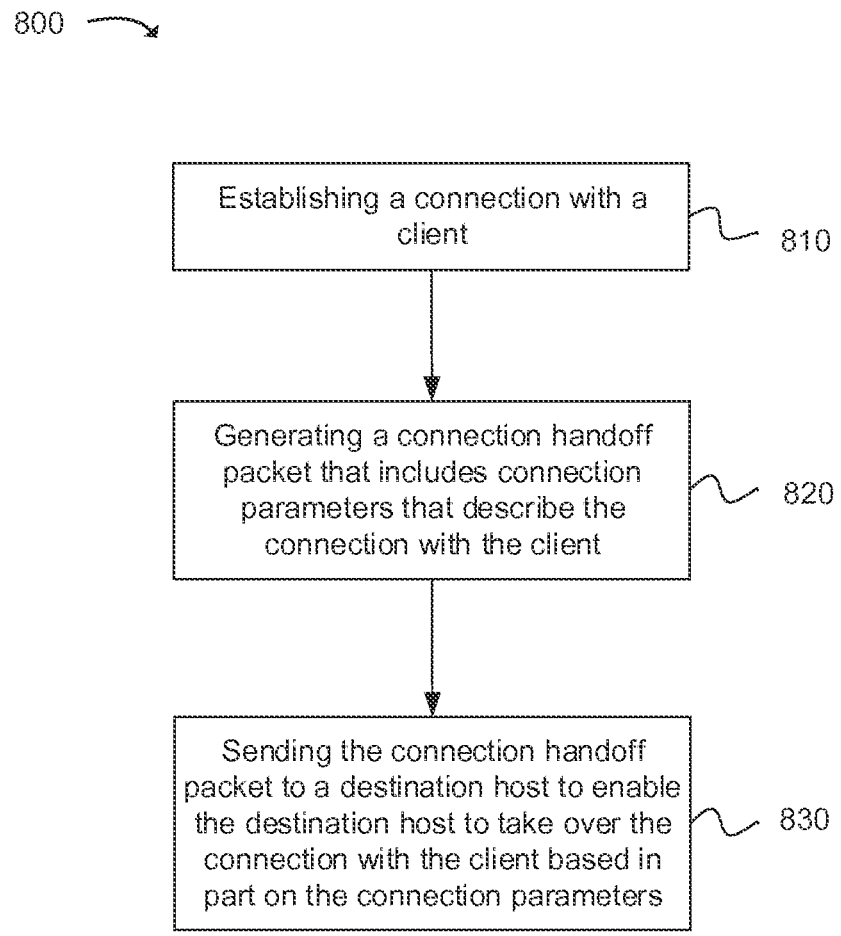
FIG. 8 is a flowchart of an example method for establishing a connection with a client.

FIG. 8 is a flowchart of an example method for establishing a connection with a client. The connection may be established with the client when an acknowledgement (ACK) packet is received from the client, as in block 810. The connection may be established between a networking device and the client. The connection may be a transmission control protocol (TCP) connection. In one configuration, the networking device may include a denial-of-service (DoS) mitigation device.

In one example, the networking device may receive a SYN packet from the client. The networking device may send a SYN-ACK packet to the client in response to receiving the SYN packet from the client. In some situations, the networking device may include a SYN cookie in the SYN-ACK packet. For example, the networking device may generate the SYN cookie when a number of incoming SYN packets exceeds a defined threshold, and send the SYN-ACK packet containing the SYN cookie to the client in order to mitigate a potential denial-of-service (DoS) attack from the client. The defined threshold may be expressed as a rate of packets per a period of time. The networking device may receive the ACK packet that includes the SYN cookie from the client in response to sending the SYN-ACK packet to the client. The networking device may verify that the SYN cookie in the ACK packet corresponds with the SYN cookie previously communicated in the SYN-ACK packet, and establish the connection with the client when the SYN cookie is valid.

A connection handoff packet that includes connection parameters that describe the connection with the client may be generated, as in block 820. The connection parameters may be included in a SYN cookie. The connection parameters may include an initial sequence number that was previously used for establishing the connection between the networking device and the client. In addition, the connection handoff packet may include a source internet protocol (IP) address, a source port, a destination IP address, a destination port, a maximum segment size, window scaling information, or a selective acknowledgement (ACK), etc. that were previously used to establish the connection between the networking device and the client.

The connection handoff packet may be communicated to a destination host, as in block 830. The connection handoff packet may enable the destination host to take over the connection with the client based on the connection parameters in the SYN cookie. In other words, the destination host may take over the connection with the client using the same connection parameters that were previously used to establish the connection between the client and the networking device. The destination host may deliver packets directly to the client using the connection. Therefore, inbound packets from the client may be communicated to the destination host via the networking device, but outbound packets may be directly communicated from the destination host to the client while bypassing the networking device. In one example, substantially no additional network connection resources may be consumed at the networking device with respect to the connection after the destination host takes over the connection with the client, but network attack mitigation and packet analysis may still be taking place using the networking device. In another example, the connection between the destination host and the client may be a TCP connection. In yet another example, a health monitoring tool may verify that packets are correctly being communicated between the destination host and the client after the connection is established. In addition, the destination host may be included in a content delivery network (CDN), domain name service (DNS) server, or web server in a computing service environment.

Figure 9:
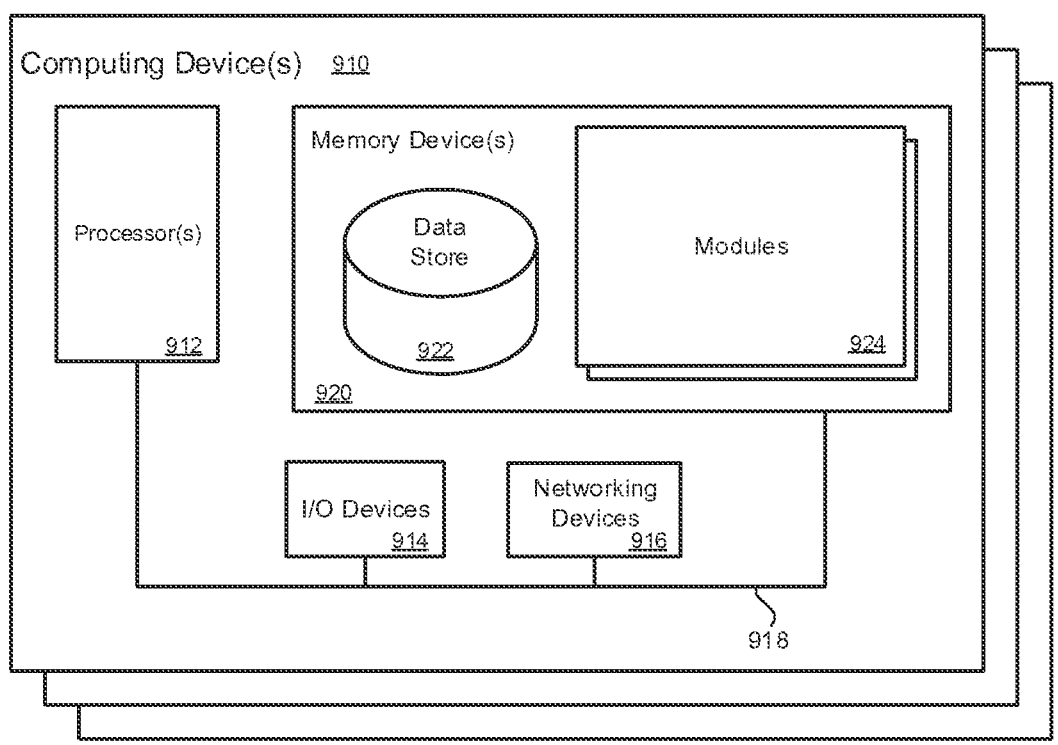
FIG. 9 is block diagram illustrating a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 818 for the components in the computing device. For example, the local communication interface may be a local data bus and/or any related address or control busses as may be desired.

The memory device 920 may contain modules 924 that are executable by the processor(s) 912 and data for the modules 1324. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for establishing and transferring transmission control protocol (TCP) connections, the method comprising:
generating a synchronize (SYN) cookie when a number of SYN packets received at a networking device exceeds a threshold indicating a potential denial-of-service (DoS) attack, using one or more processors of a networking device;
receiving a SYN packet for establishing a TCP connection with a client, using the one or more processors of the networking device;
sending a SYN-acknowledgement (ACK) packet having the SYN cookie to the client, using the one or more processors of the networking device;
receiving an ACK packet that includes the SYN cookie from the client, using the one or more processors of the networking device;
validating the SYN cookie in the ACK packet received from the client, using the one or more processors of the networking device;
generating a connection handoff packet that includes the SYN cookie, the SYN cookie containing TCP connection parameters that define the TCP connection with the client, using the one or more processors of the networking device; and
sending the connection handoff packet to a destination host, the destination host being configured to take over the TCP connection with the client using the TCP connection parameters in the SYN cookie, the destination host being configured to communicate packets to the client using the TCP connection while bypassing the networking device, using the one or more processors of the networking device.

2. The method of claim 1, further comprising:
sending the SYN-ACK packet containing the SYN cookie to the client in order to mitigate the potential DoS attack.

3. The method of claim 1, wherein the destination host takes over the TCP connection for direct communication with the client using, in part, an initial sequence number contained in the SYN cookie.

4. The method of claim 1, wherein the TCP connection parameters in the connection handoff packet include at least one of: an initial sequence number, a source internet protocol (IP) address, a source port, a destination IP address, a destination port, a maximum segment size, window scaling information, or a selective acknowledgement (ACK).

5. A non-transitory machine readable storage medium having instructions embodied thereon, the instructions when executed by one or more processors perform the following:
receiving a synchronize (SYN) packet for establishing a connection with a client;
sending a SYN-acknowledgement (ACK) packet having a SYN cookie to the client, wherein the SYN cookie is generated when a number of received SYN packets exceeds a threshold indicating a potential denial-of-service (DoS) attack;
receiving the ACK packet containing the SYN cookie from the client;
establishing the connection with the client after validating the SYN cookie in the ACK packet received from the client;
generating a connection handoff packet that includes connection parameters that describe the connection with the client, wherein the connection parameters are included in the SYN cookie; and
sending the connection handoff packet to a destination host to enable the destination host to take over the connection with the client based in part on the connection parameters, the destination host being configured to communicate packets to the client using the connection while bypassing the networking device.

6. The non-transitory machine readable storage medium of claim 5, wherein the connection established between the destination host and the client is a transmission control protocol (TCP) connection.

7. The non-transitory machine readable storage medium of claim 5, further comprising instructions when executed perform: verifying that the SYN cookie in the ACK packet corresponds with the SYN cookie previously communicated in the SYN-ACK packet.

8. The non-transitory machine readable storage medium of claim 5, wherein the SYN cookie includes an initial sequence number that is used for establishing the connection with the client.

9. The non-transitory machine readable storage medium of claim 5, wherein a reduced amount of additional resources are consumed at the networking device with respect to the connection after the destination host takes over the connection with the client.

10. The non-transitory machine readable storage medium of claim 5, wherein a health monitoring tool is used to verify that packets are correctly being communicated between the destination host and the client after the connection is established.

11. The non-transitory machine readable storage medium of claim 5, wherein the destination host is included in a content delivery network (CDN), domain name service (DNS) server, or web server in a computing service environment.

12. A system for generating transmission control protocol (TCP) connections, the system comprising:
at least one processor;
at least one memory device including a data store to store a plurality of data and instructions that, when executed by the at least one processor, cause the system to:
receive a connection handoff packet from a denial-of-service (DoS) mitigation device that includes a synchronize (SYN) cookie with TCP connection parameters describing a TCP connection between the DoS mitigation device and a client, wherein and the SYN cookie is generated at the DoS mitigation device when a number of SYN packets received at the DoS mitigation device exceeds a threshold indicating a potential denial-of-service (DoS) attack and the TCP connection was initially established between the DoS mitigation device and the client after an acknowledgement (ACK)

with the SYN cookie is transmitted from the client and validated at the DoS mitigation device;

establish the TCP connection with the client using, in part, the TCP connection parameters included in the SYN cookie, wherein the TCP connection with the client is transferred from the DoS mitigation device; and communicate packets to the client using the TCP connection with the client while bypassing the DoS mitigation device.

13. The system of claim 12, wherein the plurality of data and instructions, when executed by the at least one processor, further cause the system to:

decode the SYN cookie included in the connection handoff packet in order to identify the TCP connection parameters.

14. The system of claim 12, wherein the TCP connection parameters include at least one of: an initial sequence number, a source internet protocol (IP) address, a source port, a destination IP address, a destination port, a maximum segment size, window scaling information, or a selective acknowledgement (ACK).

15. The system of claim 12, wherein the plurality of data and instructions, when executed by the at least one processor, further cause the system to establish the TCP connection using the TCP connection parameters that were previously used to establish the TCP connection between the DoS mitigation device and the client.

16. The system of claim 12, wherein the plurality of data and instructions, when executed by the at least one processor, further cause the system to receive inbound packets from the client via the DoS mitigation device and communicate outbound packets directly to the client.

* * * * *